US010367653B2

(12) United States Patent
Gao et al.

(10) Patent No.: US 10,367,653 B2
(45) Date of Patent: Jul. 30, 2019

(54) TRANSMITTING DATA IN PET SYSTEM

(71) Applicant: SHENYANG NEUSOFT MEDICAL SYSTEMS CO., LTD., Shenyang (CN)

(72) Inventors: Peng Gao, Shenyang (CN); Long Yang, Shenyang (CN); Peng Ning, Shenyang (CN); Yuqiu Zhao, Shenyang (CN); Liang He, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 0 days.

(21) Appl. No.: 15/660,792

(22) Filed: Jul. 26, 2017

(65) Prior Publication Data

US 2018/0034659 A1 Feb. 1, 2018

(30) Foreign Application Priority Data

Jul. 28, 2016 (CN) .......................... 2016 1 0615343

(51) Int. Cl.
*H04L 12/403* (2006.01)
*H04L 12/40* (2006.01)
*G01T 1/29* (2006.01)

(52) U.S. Cl.
CPC .......... *H04L 12/403* (2013.01); *G01T 1/2985* (2013.01); *H04L 12/40032* (2013.01)

(58) Field of Classification Search
CPC ............. H04L 12/40032; H04L 12/403; G01T 1/2985
See application file for complete search history.

(56) References Cited

U.S. PATENT DOCUMENTS

2010/0085885 A1\* 4/2010 Sakurada .............. H04J 3/0667
370/252
2015/0094571 A1\* 4/2015 Bouhnik ................ A61B 6/037
600/425

(Continued)

FOREIGN PATENT DOCUMENTS

CN 101238392 A 8/2008
CN 103099639 A 5/2013

(Continued)

OTHER PUBLICATIONS

Rajagopalan, R et al., "Data-Aggregation Techniques in Sensor Networks: A Survey," IEEE Communications Surveys & Tutorials, vol. 8, No. 4, Oct. 1, 2006, 16 pages.

(Continued)

*Primary Examiner* — Asad M Nawaz
*Assistant Examiner* — Syed Ali
(74) *Attorney, Agent, or Firm* — McCoy Russell LLP

(57) ABSTRACT

A Position Emission Tomography (PET) system is provided in the present disclosure. According to an example, the PET system includes a detector and a host computer, where the detector includes: a plurality of detector rings; each of the detector rings including n number of collecting modules arranged in a circumferential direction of the detector ring, where n is an integer greater than 1; a first collecting module of the n number of collecting modules coupled with the host computer; an n-th collecting module of the n number of collecting module coupled with a (n−1)-th collecting module; and an i-th collecting module coupled with an (i−1)-th collecting module, where i is an integer greater than 1 and less than n.

11 Claims, 3 Drawing Sheets

(56) References Cited

U.S. PATENT DOCUMENTS

| | | | |
|---|---|---|---|
| 2016/0054455 A1* | 2/2016 | Teshigawara | G01T 1/208 600/411 |
| 2016/0073975 A1* | 3/2016 | Hefetz | A61B 6/037 600/427 |
| 2016/0135768 A1* | 5/2016 | Wollenweber | A61B 6/463 600/427 |
| 2016/0354047 A1* | 12/2016 | Huston | A61B 6/465 |
| 2017/0018099 A1* | 1/2017 | Heukensfeldt Jansen | G06T 11/008 |
| 2017/0090040 A1* | 3/2017 | Grobshtein | G01T 1/164 |
| 2017/0090047 A1* | 3/2017 | Shahar | G01T 1/247 |
| 2017/0139061 A1* | 5/2017 | Yin | G01T 1/2985 |
| 2017/0325775 A1* | 11/2017 | Jiang | A61B 6/03 |
| 2017/0350993 A1* | 12/2017 | Shahar | G01T 1/24 |

FOREIGN PATENT DOCUMENTS

| | | |
|---|---|---|
| CN | 103491198 A | 1/2014 |
| EP | 1913422 B1 | 5/2015 |
| WO | 2007015198 A2 | 2/2007 |

OTHER PUBLICATIONS

European Patent Office, Extended European Search Report Issued in Application No. 17183500.2, Nov. 9, 2017, Germany, 10 pages.
State Intellectual Property Office of the People's Republic of China, Office Action and Search Report Issued in Application No. 201610615343.8, Nov. 1, 2018, 12 pages. (Submitted with Partial Translation).

* cited by examiner

TRANSMITTING DATA IN PET SYSTEM

CROSS REFERENCE TO RELATED APPLICATIONS

This application claims priority to Chinese Patent Application No. 201610615343.8 which is filed on Jul. 28, 2016, the entire content of which is incorporated herein by reference for all purposes.

BACKGROUND

The present disclosure relates to transmitting data in a Positron Emission Tomography (PET) system.

A PET system is a molecular imaging device. A tracer containing positron-emitting nuclides may emit positrons e+ during a decay process. The emitted positron e+, after moving a distance in a subject, may meet a negatron e− in surroundings and then an annihilation event may occur, thereby generating a pair of γ-photons having equal energy (511 KeV) and propagating in opposite directions (about 180 degrees). The pair of γ-photons may be detected by a detector of the PET system, thus allowing for analysis on the positrons to obtain a concentration distribution of the tracer in the subject.

The detector of the PET system may include a plurality of axially arranged detector rings. Each detector ring may be assembled from a plurality of collecting modules. A positron annihilation event may occur in an internal space formed by the plurality of the detector rings. The pair of γ-photons generated in the positron annihilation event may be incident on a pair of collecting modules in opposite directions and detected by the pair of collecting modules. A collecting module may include a scintillation crystal and a photoelectric conversion circuit. The collecting module may digitalize the collected γ-photon signal to obtain data (such as, energy information, time information and so on) for determining a coincidence event.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides a PET system, a method and device for transmitting data in the PET system, which can simplify a structure of the device for transmitting data in the PET system.

In general, one innovative aspect of the subject matter described in the present disclosure can be embodied in a PET system that include a detector and a host computer, where the detector includes a plurality of detector rings, each of the detector rings including n number of collecting modules arranged in a circumferential direction of the detector ring, a first collecting module of the n number of collecting modules coupled with the host computer, an n-th collecting module of the n number of collecting module coupled with a (n−1)-th collecting module, an i-th collecting module coupled with a (i−1)-th collecting module. Where n is an integer greater than 1, and i is an integer greater than 1 and less than n.

In some implementations, the n-th collecting module is configured to transmit a data packet collected by itself to the (n−1)-th collecting module; the i-th collecting module is configured to transmit a data packet obtained by superposing a data packet collected by itself with a data packet received from a (i+1)-th collecting module to the (i−1)-th collecting module; the first collecting module is configured to transmit a data packet obtained by superposing a data packet collected by itself with a data packet received from a second collecting module to the host computer; and the host computer is configured to conduct a determination of a coincidence event based on the data packet received from the first collecting module.

In some implementations, the first collecting module is further configured to receive instruction information from the host computer, obtain a control instruction corresponding to the first collecting module from the instruction information, and transmit the instruction information to the second collecting module. The i-th collecting module is further configured to receive the instruction information from the (i−1)-th collecting module, obtain a control instruction corresponding to the i-th collecting module from the instruction information, and transmit the instruction information to the (i+1)-th collecting module. The n-th collecting module is further configured to receive the instruction information from the (n−1)-th collecting module, and obtain a control instruction corresponding to the n-th collecting module from the instruction information.

In some implementations, the n number of collecting modules are coupled in sequence by a serial bus including an uplink and a downlink; the uplink is configured to transmit a data packet from the j-th collecting module to the (j−1)-th collecting modules, where j is an integer greater than 1 but not greater than n; and the downlink is configured to transmit the instruction information from the (j−1)-th collecting module to the j-th collecting module.

In some implementations, a data packet collected by each of the collecting modules includes a time slot, an address of the collecting module and data information. The data packet transmitted from the i-th collecting module to the (i−1)-th collecting module is obtained by superposing the data packet collected by the i-th collecting module with the data packet received from the (i+1)-th collecting module in an order of respective addresses of the collecting modules. The data packet transmitted from the first collecting module to the host computer is obtained by superposing the data packet collected by the first collecting module with the data packet received from the second collecting module in the order of respective addresses of the collecting modules.

Another innovative aspect of the subject matter described in the present disclosure can be embodied in a data transmitting device in a PET system. The device includes n number of collecting modules in a serial connection, where the n number of collecting modules include an n-th collecting module, an i-th collecting module and a first collecting module, n is an integer greater than 1, i is an integer greater than 1 and less than n; the n-th collecting module is configured to transmit a data packet collected by itself to a (n−1)-th collecting module; the i-th collecting module is configured to transmit a data packet obtained by superposing a data packet collected by itself with a data packet received from a (i+1)-th collecting module to the (i−1)-th collecting module; the first collecting module is configured to transmit a data packet obtained by superposing a data packet collected by itself with a data packet received from a second collecting module to a host computer; and the host computer is configured to conduct a determination of a coincidence event based on the data packet received from the first collecting module.

In some implementations, the first collecting module is further configured to receive instruction information from the host computer, obtain a control instruction corresponding to the first collecting module from the instruction information, and transmit the instruction information to the second collecting module. The i-th collecting module is further configured to receive the instruction information from the (i−1)-th collecting module, obtain a control instruction corresponding to the i-th collecting module from the instruction information, and transmit the instruction information to the (i+1)-th collecting module. The n-th collecting module is further configured to receive the instruction information from the (n−1)-th collecting module, and obtain a control instruction corresponding to the n-th collecting module from the instruction information.

In some implementations, the n number of collecting modules are coupled in sequence by a serial bus including an uplink and a downlink. The uplink is configured to transmit a data packet from the j-th collecting module to the (j−1)-th collecting modules, where j is an integer greater than 1 but not greater than n. The downlink is configured to transmit the instruction information from the (j−1)-th collecting module to the j-th collecting module.

In some implementations, a data packet collected by each of the collecting modules includes a time slot, an address of the collecting module and data information. The data packet transmitted from the i-th collecting module to the (i−1)-th collecting module is obtained by superposing the data packet collected by the i-th collecting module with the data packet received from the (i+1)-th collecting module in an order of respective addresses of the collecting modules. The data packet transmitted from the first collecting module to the host computer is obtained by superposing the data packet collected by the first collecting module with the data packet received from the second collecting module in the order of respective addresses of the collecting modules.

Another innovative aspect of the subject matter described in the present disclosure can be embodied in a method of transmitting data in a PET system, applied to a detector ring in the PET system, where the detector ring includes n number of collecting modules including an n-th collecting module, an i-th collecting module, and a first collecting module; the n number of collecting modules are in a serial connection; n is an integer greater than 1; and i is an integer greater than 1 and less than n. The method includes: the n-th collecting module transmitting a data packet collected by itself to a (n−1)-th collecting module; the i-th collecting module transmitting a data packet obtained by superposing a data packet collected by itself with a data packet received from a (i+1)-th collecting module to the (i−1)-th collecting module; the first collecting module transmitting a data packet obtained by superposing a data packet collected by itself with a data packet received from a second collecting module to a host computer; and the host computer conducting a determination of a coincidence event based on the data packet received from the first collecting module.

In some implementations, the method further includes: the first collecting module receiving instruction information from the host computer, obtaining a control instruction corresponding to the first collecting module from the instruction information, and transmitting the instruction information to the second collecting module; the i-th collecting module receiving the instruction information from the (i−1)-th collecting module, obtaining a control instruction corresponding to the i-th collecting module from the instruction information, and transmitting the instruction information to the (i+1)-th collecting module; and the n-th collecting module receiving the instruction information from the (n−1)-th collecting module, and obtaining a control instruction corresponding to the n-th collecting module from the instruction information.

In some implementations, the n number of collecting modules are coupled in sequence by a serial bus including an uplink and a downlink. The uplink is configured to transmit a data packet from the j-th collecting module to the (j−1)-th collecting modules, where j is an integer greater than 1 but not greater than n. The downlink is configured to transmit the instruction information from the (j−1)-th collecting module to the j-th collecting module.

In some implementations, a data packet collected by each of the collecting modules itself includes a time slot, an address of the collecting module and data information. The data packet transmitted from the i-th collecting module to the (i−1)-th collecting module is obtained by superposing the data packet collected by the i-th collecting module with the data packet received from the (i+1)-th collecting module in an order of respective addresses of the collecting modules. The data packet transmitted from the first collecting module to the host computer is obtained by superposing the data packet collected by the first collecting module with the data packet received from the second collecting module in the order of respective addresses of the collecting modules.

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
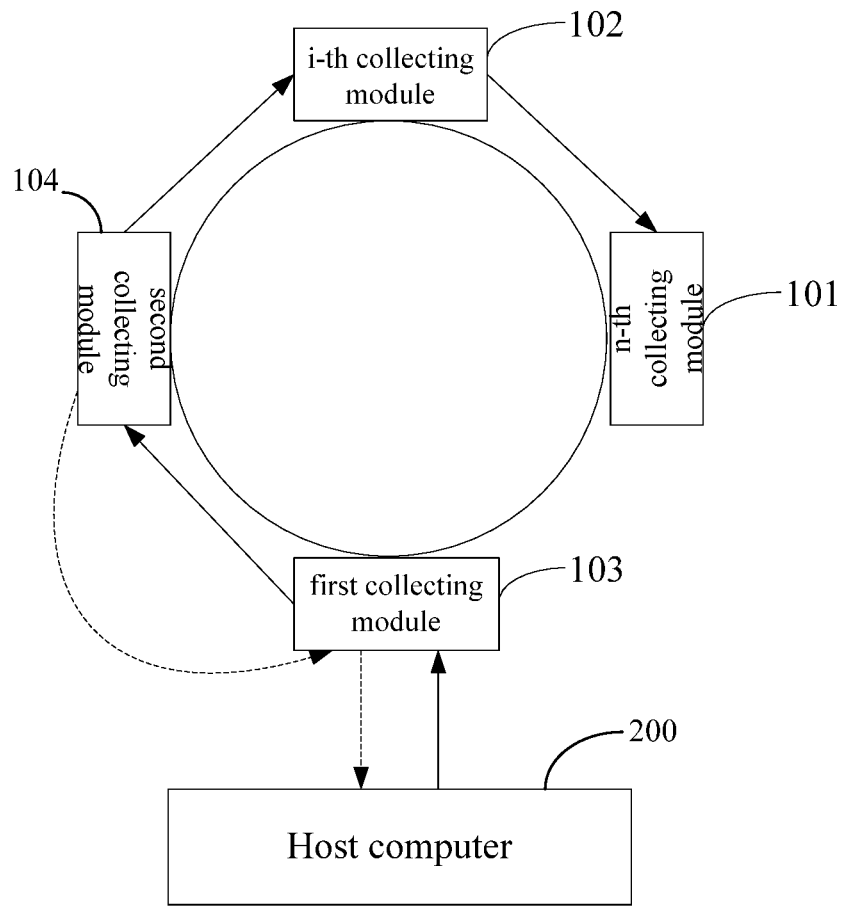
FIG. 1 is a schematic diagram of a data transmitting device in a PET system according to an example of the present disclosure.

In an example, a data transmitting device in a PET system may include a plurality of collecting modules, a data gathering module and a coincidence processing module. Each of the collecting modules may be coupled with the data gathering module. Each of the collecting modules may send the respective collected data packet to the data gathering module. The data gathering module may gather the received data packets and then send the gathered data packet to the coincidence processing module, where the coincidence processing module may be configured to obtain coincidence data by determining a coincidence event. After the determination, the coincidence processing module may transmit the coincidence data to a host computer for reconstructing an image. In this way, data transmission in the PET system may be realized. In addition, it may be further required that a bus configured to transmit instructions is coupled with each of the collecting modules, so as to complete relevant configuration for the collecting module and read a status of the collecting module. However, if it is desired to reconstruct an image having higher resolution, more collecting modules may be configured in the data transmitting device. Where since each of the collecting modules may be coupled with not only the data gathering module but also the corresponding bus configured to transmit instructions, connection of the various lines may be relatively complex; in addition, the data gathering module may need a large number of interfaces for coupling each of the collecting modules, which may be adverse to the device integration. Therefore, this data transmitting mode may not meet such a new requirement. Moreover, with the development of the PET system, a requirement for transmitting data in real-time may be higher. If it is required that time for configuring the collecting module and data transmitting is shortened, low-speed buses used in this the data transmitting mode may not satisfy such a requirement.

A device and a method for transmitting data in a PET system are provided in the present disclosure. The collecting modules distributed in the PET system may be coupled in a serial non-closed-loop connection manner with a high-speed serial bus. The serial bus may include an uplink and a downlink. The uplink may be configured to transmit a data packet from the j-th collecting module to the (j−1)-th collecting modules, and the downlink may be configured to transmit instruction information from the (j−1)-th collecting module to the j-th collecting module so as to realize functions such as configuration for the collecting module. Where j is an integer greater than 1 but not greater than a number of collecting modules in a detector ring of the PET system. The data transmitting device does not include the data gathering module and the coincidence processing module, thereby simplifying the structure of the data transmitting device. Where the data gathering may be achieved in a way that each of the collecting modules superposes the collected data packet step-by-step during the data transmitting process. In this way, the integrity of the collected data packet may be ensured and a data packet may be transmitted in real-time. At the same time, a host computer may be configured to conduct a determination of a coincidence event based on a special data structure formed by superposing the collected data packets during the data transmitting process, so as to obtain coincidence data and reconstruct a relevant image according to the coincidence data.

FIG. 1 is a schematic diagram of a data transmitting device in a PET system according to an example of the present disclosure. The data transmitting device may include n number of collecting modules, such as an n-th collecting module 101, an i-th collecting module 102 (such as a second collecting module 104) and a first collecting module 103. The n number of collecting modules may be coupled in a serial connection. Here, n is an integer greater than 1 and i is an integer greater than 1 and less than n, respectively.

The data transmitting device includes n number of collecting modules. Where the first collecting module 103 is coupled with a host computer 200; the n-th collecting module 101 is the last collecting module in the serial connection; and the i-th collecting module 102 is located between the first collecting module 103 and the n-th collecting module 101. For example, when n is 5, i may be 2, 3, and 4. In this case, the data transmitting device includes five collecting modules in total, such as, a first collecting module, a second collecting module, a third collecting module, a fourth collecting module, and a fifth collecting module. These five modules may be coupled in a serial connection.

Figure 2:
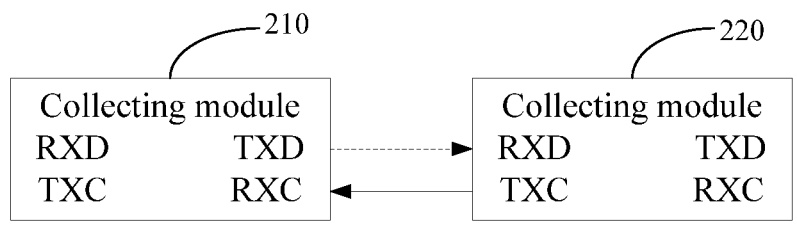
FIG. 2 illustrates a connection between any two adjacent collecting modules according to an example of the present disclosure.

In one or more examples, n number of collecting modules may be in a serial connection, e.g., the collecting modules are coupled in a serial non-closed-loop connection manner with a serial bus. The data transmitting speed is high on the serial bus, thereby ensuring data transmission in real-time. The serial bus may include an uplink and a downlink. As shown in FIG. 1, the uplink is represented by a dotted line, and the downlink is represented by a full line. FIG. 2 illustrates a connection between any two adjacent collecting modules 210 and 220. The uplink (TXD, RXD) may be configured to transmit a data packet, and the downlink (TXC, RXC) may be configured to transmit instruction information. For the data transmitting device, a set of serial buses may be enough to couple all collecting modules together. The structure of the device is simple and facilitates the device integration.

In one or more examples, the n-th collecting module 101 may be configured to transmit a data packet collected by itself to the (n−1)-th collecting module.

The i-th collecting module 102 may be configured to transmit a data packet obtained by superposing a data packet collected by itself with a data packet received from the (i+1)-th collecting module to the (i−1)-th collecting module.

The first collecting module 103 may be configured to transmit a data packet obtained by superposing a data packet collected by itself with a data packet received from the second collecting module 104 to the host computer 200, so that the host computer 200 may conduct a determination of a coincidence event based on the data packet received from the first collecting module.

In practical application, when the collecting module works, it may collect a data packet and transmit the collected data packet. Driven by device clock ticks, the collected data packet may be orderly transmitted from the n-th collecting module in a forward direction. Each of the collecting modules except for the n-th collecting module may superpose the data packet collected by itself with the received data packet to form a superposed data packet and may continue to transmit the superposed data packet in the forward direction; and finally the first collecting module may transmit the superposed data packet to the host computer. This process is lossless superposition of the data packet.

In one or more examples, photon detection data collected by each of the collecting modules may include time information, energy information and so on when photons are detected. The photon detection data may be used for the subsequent determination of a coincidence event. Then, the collecting module may package the photon detection data collected in a particular time slot into a data packet, add the time slot and address information of the collecting module into the data packet and then transmit the data packet to a collecting module previous to the collecting module. Here, the time slot may be a time interval of a preset length, for example, 10:05 am to 10:10 am. The data packet transmitted from the i-th collecting module to the (i−1)-th collecting module may be obtained by superposing the data packet collected by the i-th collecting module with the data packet received from the (i+1)-th collecting module in an order of respective addresses of the collecting modules. The data packet transmitted from the first collecting module to the host computer may be obtained by superposing the data packet collected by the first collecting module with the data packet received from the second collecting module in the order of respective addresses of the collecting modules. In summary, the data packet superposed by a collecting module may be obtained by superposing the data packet collected by itself with the received data packet in the order of respective addresses of the collecting modules.

In practical application, each of the collecting modules in the data transmitting device may work independently to recognize photon signals. When photon signals are recognized by the collecting module, the collecting module may collect a data packet. Where the data packet may include detailed information such as a time slot, an address of the collecting module, data (e.g., time information and energy information) and so on. Each of the collecting modules except for the first collecting module may superpose the collected data packet with a received data packet to generate a new data packet and transmit the new data packet to a previous collecting module. The first collecting module may superpose the collected data packet by itself with a received data packet to generate a new data packet and transmit the new data packet to the host computer. In one example practical application, the contents of the data packet received by the host computer can be as shown in Table 1.

TABLE 1

| Time slot | Address 1 | Data |
| Time slot | Address 2 | Data |
| ... | ... | ... |
| Time slot | Address i | Data |
| ... | ... | ... |
| Time slot | Address n-1 | Data |
| Time slot | Address n | Data |

The host computer may store the data packet received from the first collecting module into a memory unit corresponding to the host computer and then the processor of the host computer may conduct a determination of a coincidence event with the received data packet. For determining a coincidence event, the processor may firstly combine a plurality of data packets from the same time slot into a data combination, and then determine a coincidence event with the data combination based on a correspondence between respective addresses of the collecting modules and the data packets. In this way, a series of coincidence events may be determined and an image may be reconstructed based on the coincidence events.

In one or more examples, each of the data packet collected by the n-th collecting module, the data packet superposed by the i-th collecting module, and the data packet superposed by the first collecting module may be transmitted by a corresponding uplink.

For example, the n-th collecting module may transmit the data packet collected by itself to the (n−1)-th collecting module over the corresponding uplink; the i-th collecting module may transmit a superposed data packet to the (i−1)-th collecting module over the corresponding uplink; and the first collecting module may transmit a superposed data packet to the host computer over the corresponding uplink.

In addition, in one or more examples, the first collecting module may further configured to receive instruction information from the host computer, obtain a control instruction corresponding to the first collecting module from the instruction information and transmit the instruction information to the second collecting module.

For example, the i-th collecting module may further configured to receive the instruction information from the (i−1)-th collecting module, obtain a control instruction corresponding to the i-th collecting module from the instruction information and transmit the instruction information to the (i+1)-th collecting module.

The n-th collecting module may further configured to receive the instruction information from the (n−1)-th collecting module and obtain a control instruction corresponding to the n-th collecting module from the instruction information.

In at least one example practical application, the collecting module may transmit a superposed data packet while receiving the instruction information. The instruction information may include respective addresses of the collecting modules and a control instruction corresponding to each of the collecting modules. For example, the instruction information may be shown in Table 2.

TABLE 2

| Address 1 | Control instruction 1 |
| Address 2 | Control instruction 2 |
| ... | ... |
| Address i | Control instruction i |
| ... | ... |
| Address n-1 | Control instruction n-1 |
| Address n | Control instruction n |

Each of the collecting modules may obtain a corresponding control instruction according to a respective address. For example, each of the collecting modules may obtain a corresponding control instruction based on the instruction information, respectively, and complete related operations according to the corresponding control instruction, such as, the configuration of a parameter table, feedback of status information, and so on.

In addition, a data packet transmitted by a collecting module may include not only data for determination of a coincidence event, but also parameter information to be fed back according to the received control instruction, such as, temperature, voltage, current and so on.

In one or more examples, instruction information may be transmitted over a downlink.

For example, the first collecting module may receive instruction information from the host computer over the corresponding downlink and transmit the instruction information to the second collecting module over the corresponding downlink; the i-th collecting module may receive the instruction information from the (i−1)-th collecting module over the corresponding downlink and transmit the instruction information to the (i+1)-th collecting module over the corresponding downlink; and the n-th collecting module may receive the instruction information from the (n−1)-th collecting module over the corresponding downlink.

Since the instruction information may further be transmitted by a high-speed serial bus, an objective of high-speed configuration may be achieved.

In the present disclosure, a plurality of collecting modules in a data transmitting device are coupled in sequence by a serial bus. The data transmitting device is a non-closed-loop connection structure, which facilitates increasing a number of collecting modules. For example, the number of collecting modules of the data transmitting device may be set based on a requirement for the PET system. The data packets in the device may be transmitted in a forward direction from the last collecting module (e.g., the n-th collecting module). During this process, the data packets are transmitted in a unidirectional way. In the data transmitting device, a high-speed serial bus may be configured to transmit instruction information. In this way, the speed for configuring parameters of the device may be accelerated and a scanning process of the PET system may be also accelerated. The data transmitting device may not include the data gathering module and the coincidence determining module, and the structure of the device is relatively simple. The data transmitting device may transmit the data packet superposed by the first collecting module to the memory of the host computer. The processor of the host computer may conduct a determination of a coincidence event based on the particular data structure in the data packet. In this way, coincidence algorithm may be simplified and the flexibility of the device may be improved.

Figure 3:
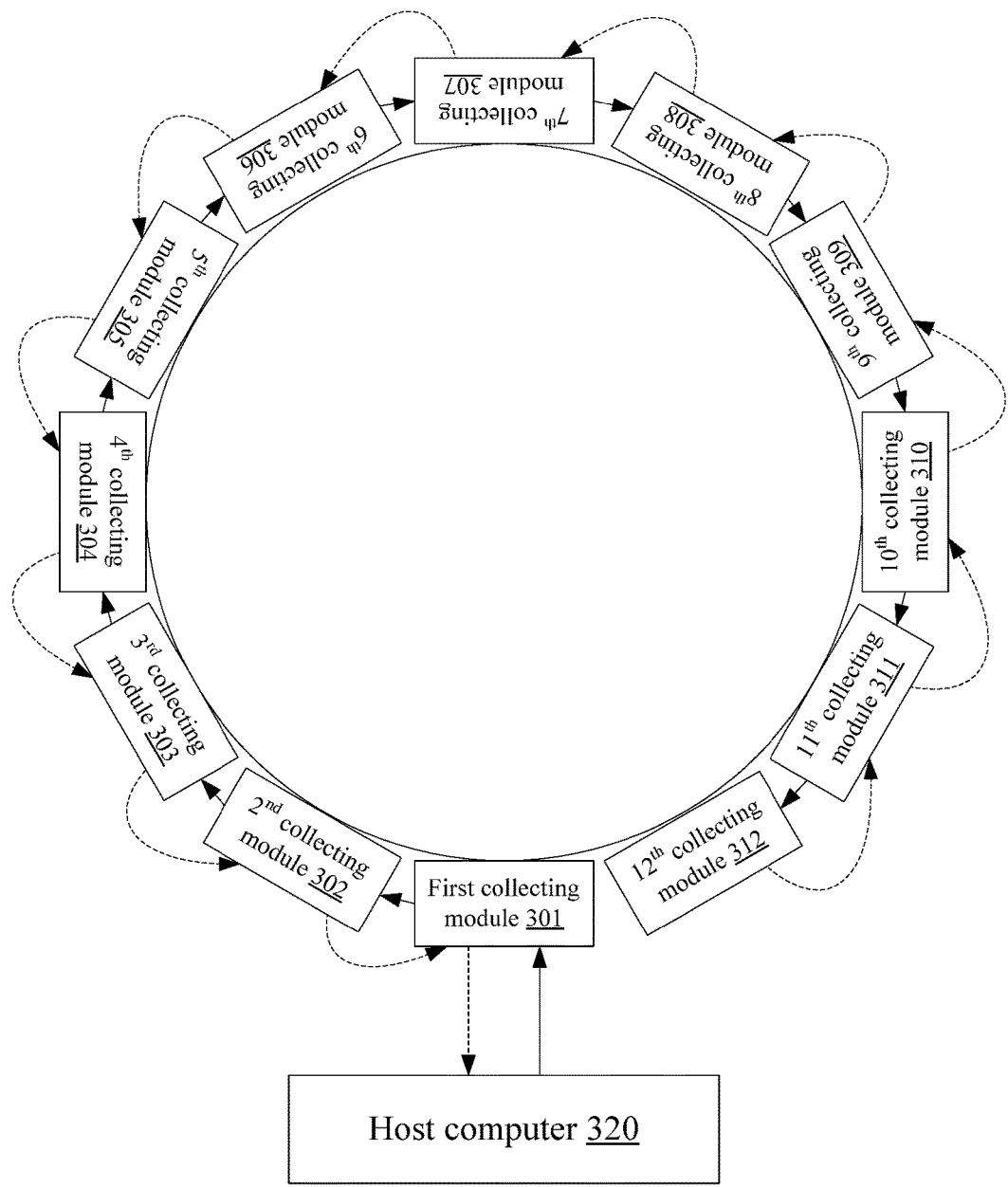
FIG. 3 is a schematic diagram of a data transmitting device in a PET system according to another example of the present disclosure.

FIG. 3 is a schematic diagram of a data transmitting device in a PET system according to another example of the present disclosure. The data transmitting device in the PET system provided in one or more examples of the present disclosure will be further described below by taking a data transmitting device including 12 collecting modules in a PET system as an example.

In this example, the data transmitting device may include 12 collecting modules, where the first collecting module 301 to the twelfth collecting module 312 is coupled in sequence by a serial bus. In practical application, any two adjacent collecting modules may be coupled in series by a corresponding serial bus. The serial bus may include an uplink and a downlink. The uplink may be configured to transmit a data packet. The downlink may be configured to transmit instruction information from a user. In FIG. 3, the uplink is represented by a dotted line, and the downlink is represented by a full line. The first collecting module may also be coupled with a host computer 320 by a serial bus.

Firstly, the host computer 320 may transmit a synchronizing signal to each of the collecting modules 301, 302, 303, 304, 305, 306, 307, 308, 309, 310 311, 312 one by one over the corresponding downlink. Unified collection time may be determined for each of the collecting modules. At a fixed moment after the collection time, the twelfth collecting module 312 may begin to transmit the collected data packet to the eleventh collecting module 311, and then the eleventh collecting module 311 may transmit the data packet obtained by superposing the received data packet and the data packet collected by itself to the tenth collecting module 310, and so on, until the first collecting module 301 may transmit the data packet obtained by superposing the received data packet from the second collecting module 302 and the data packet collected by itself to the host computer 320, thus completing transmission of the data packets. Furthermore, the host computer 320 may further transmit instruction information to the first collecting module 301. The instruction information may be transmitted one by one in a backward direction until to the twelfth collecting module 312. Each of the collecting modules may obtain its own corresponding control instruction from the instruction information based on the address of the collecting module. In a process of transmitting the data packet from the twelfth collecting module 312 to the first collecting module 301, not only the data for determining a coincidence event may be transmitted, but also the data (such as, temperature, voltage, current and so on) collected according to the instruction information may be transmitted.

In this way, the collecting modules are coupled in the manner of serial non-closed-loop connection in one or more examples of the present disclosure. The last collecting module may transmit a data packet collected by itself in a forward direction; each of collecting modules other than the last collecting module may transmit a data packet which is obtained by superposing a data packet collected by itself to a received data packet in the forward direction; and finally, a data packet comprising respective data packets collected by the collecting modules may be transmitted from the first collecting module to the host computer for determining a coincidence event. For example, the first collecting module may generate the data packet comprising respective data packets collected by the collecting modules by superposing a data packet collected by itself to a data packet received from the second collecting module. Gathering of respective data packets collected by the collecting modules is achieved during data transmission without an additional data gathering module and a large number of data interfaces. The connection structure of the data transmitting device may be simple, which facilitates the device integration and expansion of the number of collecting modules.

In one or more examples, a PET system is provided in the present disclosure. The PET system may include a detector and a host computer. The detector may include a plurality of detector rings and each of the detector rings may include the data transmitting device as described above.

Figure 4:
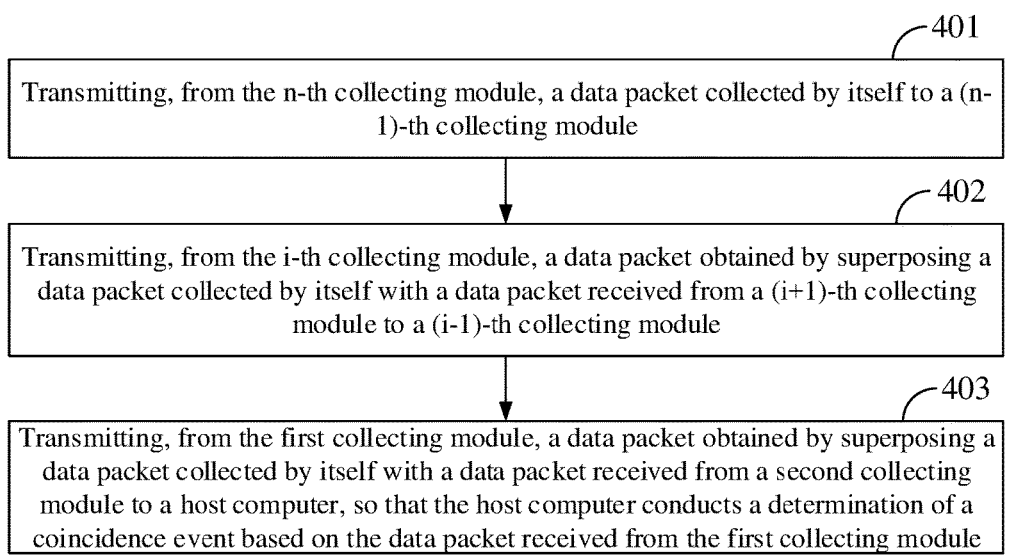
FIG. 4 is a flowchart of a method of transmitting data in a PET system according to an example of the present disclosure.

FIG. 4 is a flowchart of a method of transmitting data in a PET system according to an example of the present disclosure. The method of transmitting data may be applied to a detector ring in the PET system. The detector ring may include n number of collecting modules coupled in sequence. The n number of collecting modules may include an n-th collecting module, an i-th collecting module and a first collecting module. The collecting modules are in a serial connection. Where n is an integer greater than 1 and i is an integer greater than 1 but less than n. In one or more example, n number of collecting modules may be in a serial connection such as coupled in sequence by a serial bus. The serial bus may include an uplink and a downlink. The method of transmitting data may include blocks 401 to 403.

At block 401, the n-th collecting module transmits a data packet collected by itself to a (n−1)-th collecting module.

At block 402, the i-th collecting module transmits a data packet obtained by superposing a data packet collected by itself with a data packet received from a (i+1)-th collecting module to the (i−1)-th collecting module.

At block 403, the first collecting module transmits a data packet obtained by superposing a data packet collected by itself with a data packet received from a second collecting module to a host computer, so that the host computer conducts a determination of a coincidence event based on the data packet received from the first collecting module.

In one or more examples, a data packet collected by each of the collecting modules may include a time slot, an address of the collecting module, and data information. The data packet transmitted from the i-th collecting module to the (i−1)-th collecting module may be obtained by superposing the data packet collected by the i-th collecting module with the data packet received from the (i+1)-th collecting module in an order of respective addresses of the collecting modules.

The data packet transmitted from the first collecting module to the host computer may be obtained by superposing the data packet collected by the first collecting module with the data packet received from the second collecting module in the order of respective addresses of the collecting modules.

Figure 5:
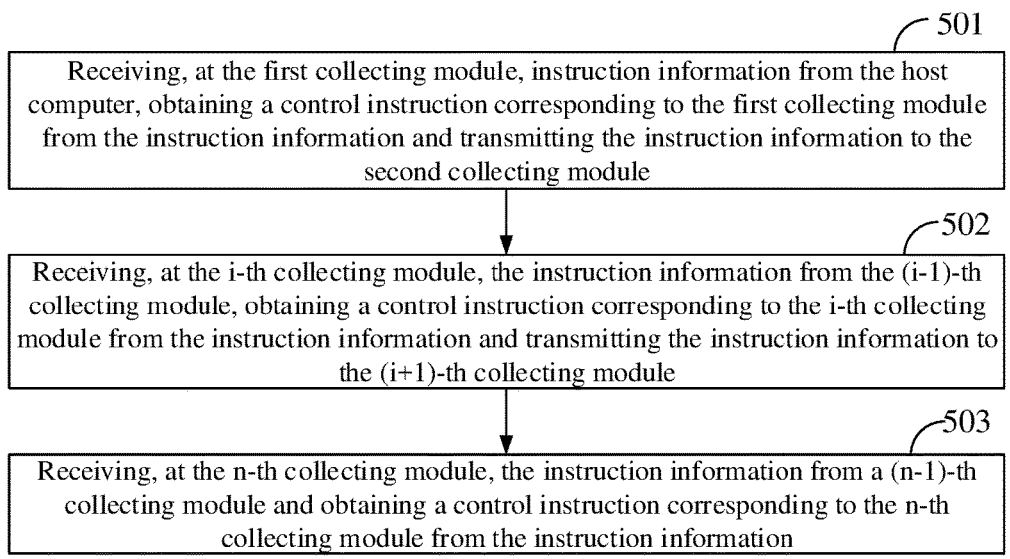
FIG. 5 is a flowchart of a method of transmitting data in a PET system according to another example of the present disclosure.

FIG. 5 is a flowchart of a method of transmitting data in a PET system according to another example of the present disclosure. Based on FIG. 4, the method of transmitting data in the PET system provided in an example of the present disclosure may further include blocks 501 to 503.

At block 501, the first collecting module receives instruction information from the host computer, obtains a control instruction corresponding to the first collecting module from the instruction information, and transmits the instruction information to the second collecting module.

In an example, each of the data packet collected by the n-th collecting module, the data packet superposed by the i-th collecting module, and the data packet superposed by the first collecting module may be transmitted over an uplink.

At block 502, the i-th collecting module receives the instruction information from the (i−1)-th collecting module, obtains a control instruction corresponding to the i-th collecting module from the instruction information, and transmits the instruction information to the (i+1)-th collecting module.

At block 503, the n-th collecting module receives the instruction information from the (n−1)-th collecting module and obtains a control instruction corresponding to the n-th collecting module from the instruction information.

In one or more examples, the instruction information may be transmitted over a downlink.

The collecting modules may be coupled in the manner of serial non-closed loop connection in one or more examples of the present disclosure, and the last collecting module may transmit the data packet collected by itself in a forward direction; each of other collecting modules other than the last collecting module may transmit a data packet obtained by superposing the received data packet and the data packet collected by itself one by one in the forward direction; and finally, a data packet collected by each of the collecting modules may be transmitted to the host computer for determining a coincidence event. For example, the first collecting module may transmit a data packet obtained by superposing a data packet collected by itself with a data packet received from the second collecting module. Gathering of respective data packets collected by the collecting modules is achieved during transmission of the data packets without an additional data gathering module and a large number of data interfaces. The connection structure of the data transmitting device may thus be simple, which facilitates the device integration and expansion of the number of collecting modules.

It shall be noted that different examples in the present disclosure are described in a progressive way with emphasis on descriptions of differences from other examples. The same or similar parts between the various examples may be referred to each other. For the method disclosed by examples, as it corresponds to the system and device disclosed by the examples, so the description is relatively simple. Relevant parts may see the description of the system and the device for reference.

It needs to be noted that relational terms such as first, second and the like in this text are merely used for differentiating one entity or operation from another entity or operation rather than definitely requiring or implying any actual relationship or order between these entities or operations. In addition, the terms "comprising" and "including", or any other variants thereof are intended to be non-exclusive, such that a process, a method, an article or a device comprising a series of elements includes not only those elements, but also other elements not explicitly listed, or further includes inherent elements of the process, the method, the article or the device. Without more limitations, elements defined by the sentence of "comprising a . . . " shall not be exclusive of additional same elements also existing in the process, the method, the article or the device.

Combined with the examples disclosed in the present disclosure, blocks of the method may be carried out directly by hardware, software modules executed by a processor, or by combination thereof. The software modules may be placed in a random-access memory (RAM), a memory, a read-only memory (ROM), an electrically programmable ROM, an electrically erasable programmable ROM, a register, a hard drive, a removable magnetic disk, a CD-ROM, or any type of storage medium that is well known in the prior art.

The foregoing descriptions of the disclosed examples allow those skilled in the art to realize or use the present disclosure. Various modifications to these examples will be apparent for those skilled in the art, and the general principles defined herein may be realized in other examples without departing from the spirit or scope of the present disclosure. Hence, the present disclosure shall not be limited to these examples shown herein, but may fall into the widest scope compliant with the principles and novelty disclosed herein.

The invention claimed is:

1. A Positron Emission Tomography (PET) system, comprising:
a detector, configured to detect a γ-photon generated by an annihilation event and transmit photon information to a host computer; and
the host computer, configured to conduct a determination of a coincidence event based on the photon information;
wherein the detector comprises:
a plurality of detector rings;
each of the detector rings comprising n number of collecting modules arranged in a circumferential direction of the detector ring, wherein n is an integer greater than 1, and each of the collecting modules comprising a scintillation crystal and a photoelectric conversion circuit;
a first collecting module of the n number of collecting modules coupled with the host computer;
an n-th collecting module of the n number of collecting module coupled with an (n−1)-th collecting module; and
an i-th collecting module coupled with an (i−1)-th collecting module, wherein i is an integer greater than 1 and less than n; wherein
the n-th collecting module is configured to transmit a data packet collected by itself to the (n−1)-th collecting module;
the i-th collecting module is configured to transmit a data packet obtained by superposing a data packet collected by itself with a data packet received from an (i+1)-th collecting module to the (i−1)-th collecting module;
the first collecting module is configured to transmit a data packet obtained by superposing a data packet collected by itself with a data packet received from a second collecting module to the host computer; and the host computer is configured to conduct the determination of the coincidence event based on the data packet received from the first collecting module, wherein the first collecting module is further configured to
receive instruction information from the host computer,
obtain a control instruction corresponding to the first collecting module from the instruction information, and
transmit the instruction information to the second collecting module;

the i-th collecting module is further configured to
receive the instruction information from the (i−1)-th collecting module,
obtain a control instruction corresponding to the i-th collecting module from the instruction information, and
transmit the instruction information to the (i+1)-th collecting module; and the n-th collecting module is further configured to
receive the instruction information from the (n−1)-th collecting module, and
obtain a control instruction corresponding to the n-th collecting module from the instruction information.

2. The system according to claim 1, wherein
the n number of collecting modules are coupled in sequence by a serial bus comprising an uplink and a downlink;
the uplink is configured to transmit a data packet from a j-th collecting module to a (j−1)-th collecting module, wherein j is an integer greater than 1 but not greater than n; and
the downlink is configured to transmit the instruction information from the (j−1)-th collecting module to the j-th collecting module.

3. The system according to claim 1, wherein a data packet collected by each of the collecting modules comprises a time slot, an address of the collecting module, and data information.

4. The system according to claim 3, wherein
the data packet transmitted from the i-th collecting module to the (i−1)-th collecting module is obtained by superposing the data packet collected by the i-th collecting module with the data packet received from the (i+1)-th collecting module in an order of respective addresses of the collecting modules; and
the data packet transmitted from the first collecting module to the host computer is obtained by superposing the data packet collected by the first collecting module with the data packet received from the second collecting module in the order of respective addresses of the collecting modules.

5. A data transmitting device in a PET system, comprising:
n number of collecting modules in a serial connection, wherein
the n number of collecting modules comprise an n-th collecting module, an i-th collecting module, and a first collecting module;
n is an integer greater than 1;
i is an integer greater than 1 and less than n;
each of the collecting modules comprises a scintillation crystal and a photoelectric conversion circuit;

the n-th collecting module is configured to transmit a data packet collected by itself to an (n−1)-th collecting module;

the i-th collecting module is configured to transmit a data packet obtained by superposing a data packet collected by itself with a data packet received from an (i+1)-th collecting module to an (i−1)-th collecting module;

the first collecting module is configured to transmit a data packet obtained by superposing a data packet collected by itself with a data packet received from a second collecting module to a host computer; and the host computer is configured to conduct a determination of a coincidence event based on the data packet received from the first collecting module, wherein the first collecting module is further configured to
receive instruction information from the host computer,
obtain a control instruction corresponding to the first collecting module from the instruction information, and
transmit the instruction information to the second collecting module;

the i-th collecting module is further configured to
receive the instruction information from the (i−1)-th collecting module,
obtain a control instruction corresponding to the i-th collecting module from the instruction information, and
transmit the instruction information to the (i+1)-th collecting module; and the n-th collecting module is further configured to
receive the instruction information from the (n−1)-th collecting module, and
obtain a control instruction corresponding to the n-th collecting module from the instruction information.

6. The device according to claim 5, wherein
the n number of collecting modules are coupled in sequence by a serial bus comprising an uplink and a downlink;
the uplink is configured to transmit a data packet from a j-th collecting module to a (j−1)-th collecting module, wherein j is an integer greater than 1 but not greater than n; and
the downlink is configured to transmit the instruction information from the (j−1)-th collecting module to the j-th collecting module.

7. The device according to claim 5, wherein a data packet collected by each of the collecting modules comprises a time slot, an address of the collecting module, and data information.

8. The device according to claim 7, wherein
the data packet transmitted from the i-th collecting module to the (i−1)-th collecting module is obtained by superposing the data packet collected by the i-th collecting module with the data packet received from the (i+1)-th collecting module in an order of respective addresses of the collecting modules; and
the data packet transmitted from the first collecting module to the host computer is obtained by superposing the data packet collected by the first collecting module with the data packet received from the second collecting module in the order of respective addresses of the collecting modules.

9. A method of transmitting data in a PET system, applied to a detector ring in the PET system, wherein the detector ring comprises n number of collecting modules comprising an n-th collecting module, an i-th collecting module, and a first collecting module, where each of the collecting modules comprises a scintillation crystal and a photoelectric conversion circuit;

the n number of collecting modules are in a serial connection, wherein the n number of collecting modules are coupled in sequence by a serial bus including an uplink and a downlink, the uplink is configured to transmit a data packet from a j-th collecting module to a (j−1)-th collecting module, j being an integer greater than 1 but not greater than n, and the downlink is configured to transmit instruction information from the (j−1)-th collecting module to the j-th collecting module;

n is an integer greater than 1; and i is an integer greater than 1 and less than n;

the method comprising:
- transmitting, by the n-th collecting module, a data packet collected by itself to an (n−1)-th collecting module;
- transmitting, by the i-th collecting module, a data packet obtained by superposing a data packet collected by itself with a data packet received from an (i+1)-th collecting module to an (i−1)-th collecting module;
- transmitting, by the first collecting module, a data packet obtained by superposing a data packet collected by itself with a data packet received from a second collecting module to a host computer; and
- conducting, by the host computer, a determination of a coincidence event based on the data packet received from the first collecting module, the first collecting module
- receiving the instruction information from the host computer,
- obtaining a control instruction corresponding to the first collecting module from the instruction information, and
- transmitting the instruction information to the second collecting module;

the i-th collecting module
- receiving the instruction information from the (i−1)-th collecting module,
- obtaining a control instruction corresponding to the i-th collecting module from the instruction information, and
- transmitting the instruction information to the (i+1)-th collecting module, and the n-th collecting module
- receiving the instruction information from the (n−1)-th collecting module, and
- obtaining a control instruction corresponding to the n-th collecting module from the instruction information.

10. The method according to claim 9, wherein a data packet collected by each of the collecting modules itself comprises a time slot, an address of the collecting module, and data information.

11. The method according to claim 10, wherein the data packet transmitted from the i-th collecting module to the (i−1)-th collecting module is obtained by superposing the data packet collected by the i-th collecting module with the data packet received from the (i+1)-th collecting module in an order of respective addresses of the collecting modules; and the data packet transmitted from the first collecting module to the host computer is obtained by superposing the data packet collected by the first collecting module with the data packet received from the second collecting module in the order of respective addresses of the collecting modules.

* * * * *